United States Patent [19]

Giles

[11] Patent Number: 5,693,878
[45] Date of Patent: Dec. 2, 1997

[54] TORQUE CONVERTER CLUTCH ENGAGEMENT TEST

[75] Inventor: Peter J. Giles, Ypsilanti, Mich.

[73] Assignee: Ford Global Technologies, Inc., Dearborn, Mich.

[21] Appl. No.: 788,095

[22] Filed: Jan. 23, 1997

[51] Int. Cl.⁶ .......................... G01M 15/00; G01M 19/00
[52] U.S. Cl. ................. 73/118.1; 340/453; 364/424.08
[58] Field of Search .................................. 73/116, 117.2, 73/117.3, 118.1; 340/438, 439, 453, 454; 364/424.08, 424.081

[56] References Cited

U.S. PATENT DOCUMENTS

| | | | |
|---|---|---|---|
| 5,089,804 | 2/1992 | Mimura | 340/453 |
| 5,129,259 | 7/1992 | View et al. | 340/453 |
| 5,189,908 | 3/1993 | Sano et al. | 73/118.1 |
| 5,455,016 | 10/1995 | Neigebauer | 73/118.1 |
| 5,467,644 | 11/1995 | Schaffer | 73/118.1 |
| 5,594,643 | 1/1997 | Birchenough et al. | 364/424.08 |
| 5,598,334 | 1/1997 | Shin et al. | 364/424.08 |
| 5,598,336 | 1/1997 | Kume et al. | 364/424.08 |

*Primary Examiner*—George M. Dombroske
*Attorney, Agent, or Firm*—James J. Dottavio

[57] ABSTRACT

A method for testing the application of a torque converter clutch in vehicle having an electronic control unit and a driveline system including an engine, a transmission, a torque converter operating to transfer engine torque to the transmission, a torque converter clutch having an applied state, and a solenoid to change the commanded apply state of the clutch. The test includes determining the state of the solenoid, determining the applied state of the clutch, commanding a change in the applied state of the clutch, and determining the time for the clutch to change applied state.

14 Claims, 4 Drawing Sheets

TORQUE CONVERTER CLUTCH ENGAGEMENT TEST

FIELD OF THE INVENTION

The present invention relates to a functionality test for a vehicular torque converter clutch.

DESCRIPTION OF THE PRIOR ART

A torque converter couples the engine to the transmission and operates to transfer engine torque to the transmission, which in turn transfers torque to the wheels. More specifically, the torque converter, which includes a clutch, operates to increase torque while reducing engine speed. Torque converters provide well-known advantages due to the infinitely variable conversion of speed and torque. Operation, or application, of the torque converter clutch is typically controlled by a solenoid.

Existing strategies for testing the torque converter clutch control system only perform electrical "presence" tests or tests which verify the clutch is applied and disengaged. These tests are not able to determine whether the clutch is being applied properly nor to detect internal leaks within the torque converter.

It would be desirable to provide a test which determines if the clutch is being engaged and disengaged in a proper manner, not just to verify engagement.

SUMMARY OF THE INVENTION

It is, therefore, an object of the present invention to provide an improved torque converter clutch functional test.

It is a further object of the present invention to provide a torque converter clutch functional test which determines whether the clutch is engaged in a timely manner from the time when the clutch is commanded to lock up and disengaged in a timely manner when the clutch is commanded unlocked.

An advantage of the present invention includes a greater diagnostic capability in a controlled environment at the transmission manufacturing facility or vehicle assembly facility. Diagnostics include the ability to detect internal leaks within the torque converter which may lead to slower lockup of the clutch. Detection of slow or fast lockups enables prediction of potential early failures of the clutch. An example of such a leak includes a missing rivet or a scuffed seal, which may lead to premature failure of the clutch. Such detection enables the manufacturer to reject a bad converter prior to installation of the transmission into the vehicle or prior to shipment of an assembled vehicle and therefore avoid a failure of the transmission in the customer's vehicle. This detection may also be useful at repair facilities to diagnose customer complaints of slow or jerky lockups.

A further advantage of the present invention may be realized in operation of the vehicle. The test, when applied during the operation of the vehicle, provides the necessary time measurements when using adaptive pressure control during torque converter clutch lock and unlock. Therefore the clutch could be used in an on/off mode by varying the pressure based on measurement of the time required for the clutch to lock or unlock instead of modulating the pressure and obtain similar functionality.

In carrying out the above objects and other objects and features of the present invention, a method and system are provided for testing the functionality of a torque converter clutch. The method includes a test of the application of a torque converter clutch in a vehicle having an electronic control unit and a driveline system including an engine, a transmission, a torque converter operating to transfer engine torque to the transmission, a torque converter clutch having an applied state, and a solenoid to change the commanded apply state of the clutch. The test includes determining the state of the solenoid, determining the applied state of the clutch, commanding a change in the applied state of the clutch, and determining the time for the clutch to change applied state.

The above objects and other objects and features of the invention will be readily appreciated by one of ordinary skill in the art from the following detailed description of the best mode for carrying out the invention when taken in connection with the following drawings.

DESCRIPTION OF THE PREFERRED EMBODIMENTS

Figure 1:
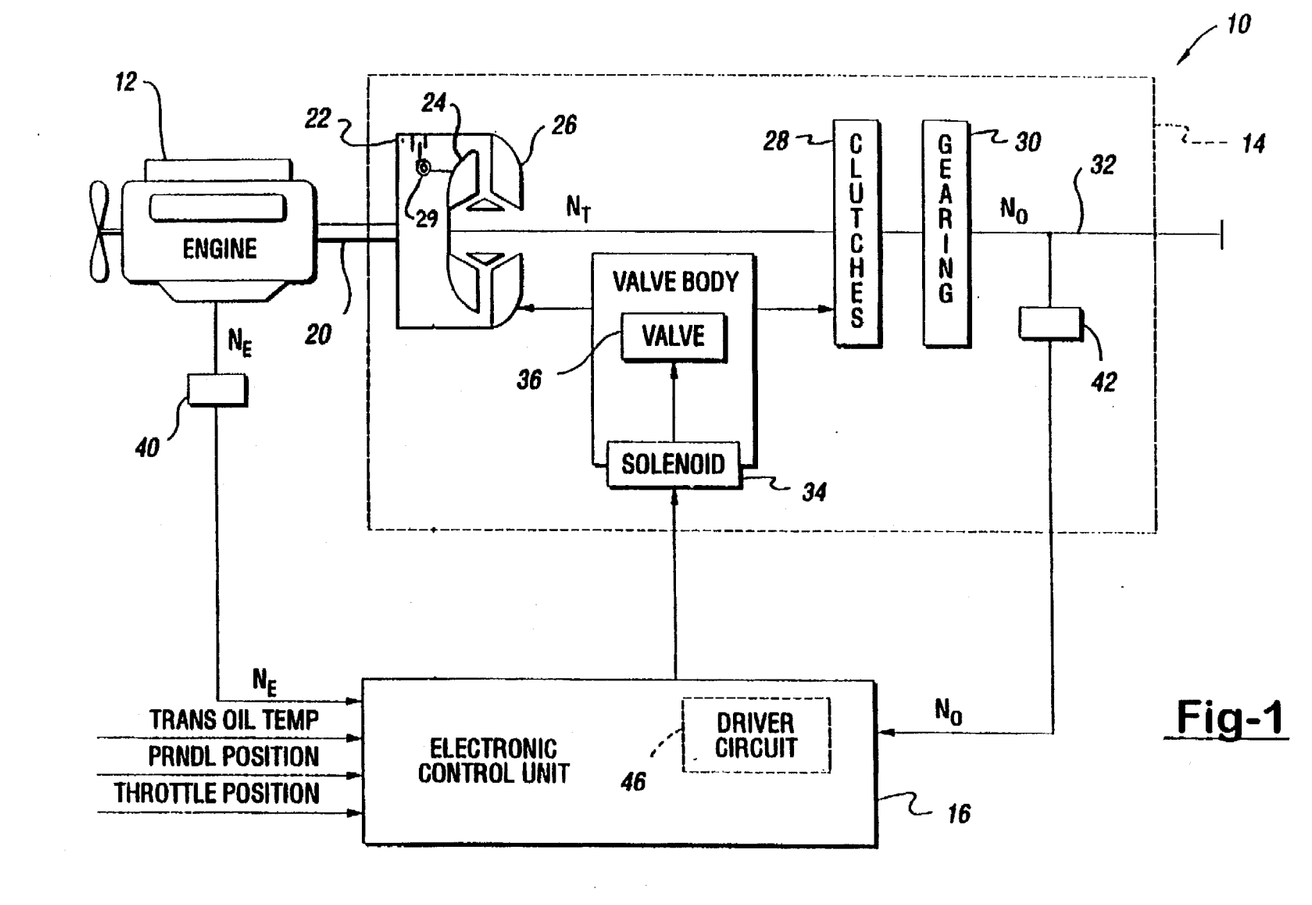
FIG. 1 is a block diagram of a system for use with the present invention.

Referring now to FIG. 1, there is shown a block diagram of a system 10 for use with the present invention. As illustrated, the system includes an internal combustion engine 12, a transmission 14 and an electronic control unit (ECU) 16. The transmission 14 transmits the torque generated by the engine through the transmission to drive axles not specifically illustrated. The torque flow originates at the engine output shaft 20 and flows through a torque converter 22, at least one clutch shown generally by reference numeral 28, and gearing shown generally by reference numeral 30, to the transmission output shaft 32, which is mechanically coupled to the drive axle.

It should be appreciated that the ECU 16 includes a microprocessor and memory, such as RAM, KAM, and ROM memories, not specifically illustrated for the sake of clarity. It should be understood that in the preferred embodiment, this ECU 16 is a powertrain control module which cooperates with other control units for performing vehicle control, although the control unit 16 could, of course, be a master vehicle control unit. The control units are encoded with computer readable code. As is known in the art, the ECU includes a computer chip onto which the method described herein is programmed. Alternatively, one skilled in the art recognizes the method described herein could be programmed into diagnostic software included on a programmable computer chip remote from the ECU, a computer disk, or any other known computer storage media.

With continuing reference to FIG. 1, the impeller 26 of the torque converter 22 is rotatably driven by the output shaft 20. The turbine 24 of the torque converter is rotatably driven by the impeller 26 by means of a known fluid transfer between the turbine and the impeller. In turn, the turbine 24 rotatably drives the transmission input shaft. Each clutch 28 is a fluid-operated, load carrying friction element which can be applied or released according to a transmission operating strategy for establishing different ratios of the gearing 30 and for establishing torque flow paths through the gearing.

In the preferred embodiment, the ECU 16 executes the strategy based on a plurality of operating parameters, such as transmission oil temperature, shift lever position and throttle position, to name a few. Sensors, such as speed sensors 40 and 42 provide engine speed ($N_E$) and vehicle speed (VS) or transmission output shaft ($N_O$) speed information, respectively, to the ECU 16. The ECU utilizes these vehicle operating parameters to determine a control signal which is utilized by standard driver circuitry 46 to obtain an electric current for energizing a torque converter clutch (TCC) solenoid shown generally by reference numeral 34. The solenoid could be, for example, a variable force solenoid (VFS) energized according to a percent (%) current control signal, or a pulse-width modulated solenoid energized according to a duty cycle control signal. The TCC solenoid 34 controls a bypass clutch control (BCC) valve 36 which is utilized to apply the torque converter clutch 29.

In a preferred embodiment, a modulated lock-up solenoid 34 is used to control the torque converter clutch 22. The solenoid 34 receives an electronic signal from the ECU 16. Solenoid regulator pressure is fed to the modulated lock-up solenoid. The solenoid is normally closed, blocking solenoid regulator pressure. This maintains converter clutch release pressure, preventing clutch application. When the solenoid 34 is energized, solenoid regulator pressure is applied to the converter clutch control valve 36, exhausting converter clutch release pressure and applying the converter clutch 22.

Preferably, the ECU does more than just turn the modulated lock-up solenoid "on" to apply the clutch, and "off" to release the clutch. Instead, the ECU adjusts the solenoid pulse width. The ECU turns the solenoid on at a constant frequency, but the length of time the solenoid stays on each time varies. The PWM solenoid used for this purpose is capable of operating at zero duty cycle (ball valve closed, clutch off, zero pressure), 100 percent duty cycle (ball valve fully open, clutch on, full pressure) or at a duty cycle between zero and 100 percent for controlled clutch slip.

During controlled slip mode, the solenoid is rapidly turned on and off by the ECU at varying rates, causing the ball valve to open and close rapidly. This in turn, controls the pressure sent to the bypass clutch control valve. When the ECU sees a need for greater solenoid output pressure, it lengthens the pulse width. That means it keeps the solenoid on longer each time it turns it on. When less output pressure is required, the ECU shortens the pulse width. By varying the solenoid pulse width, the ECU can not only apply and release the converter clutch, it can also allow controlled clutch slip. At maximum pulse width, solenoid regulator pressure pushes the converter clutch control valve to the left, exhausting release pressure. But, as the pulse width is shortened, pressure on the converter clutch control valve is reduced, increasing release pressure. With release pressure opposing apply pressure, the clutch will slip if engine torque is great enough. By varying the solenoid pulse width, the ECU can allow controlled converter clutch slip to provide the best combinations of fuel economy and performance. Furthermore, where the ECU detects delayed clutch lockup, as described below, the pulse width can be changed to expedite lockup. Alternatively, the pressure regulator 58 may be used to vary the pressure to the clutch and therefore affect the apply rate as described below.

Figure 2:
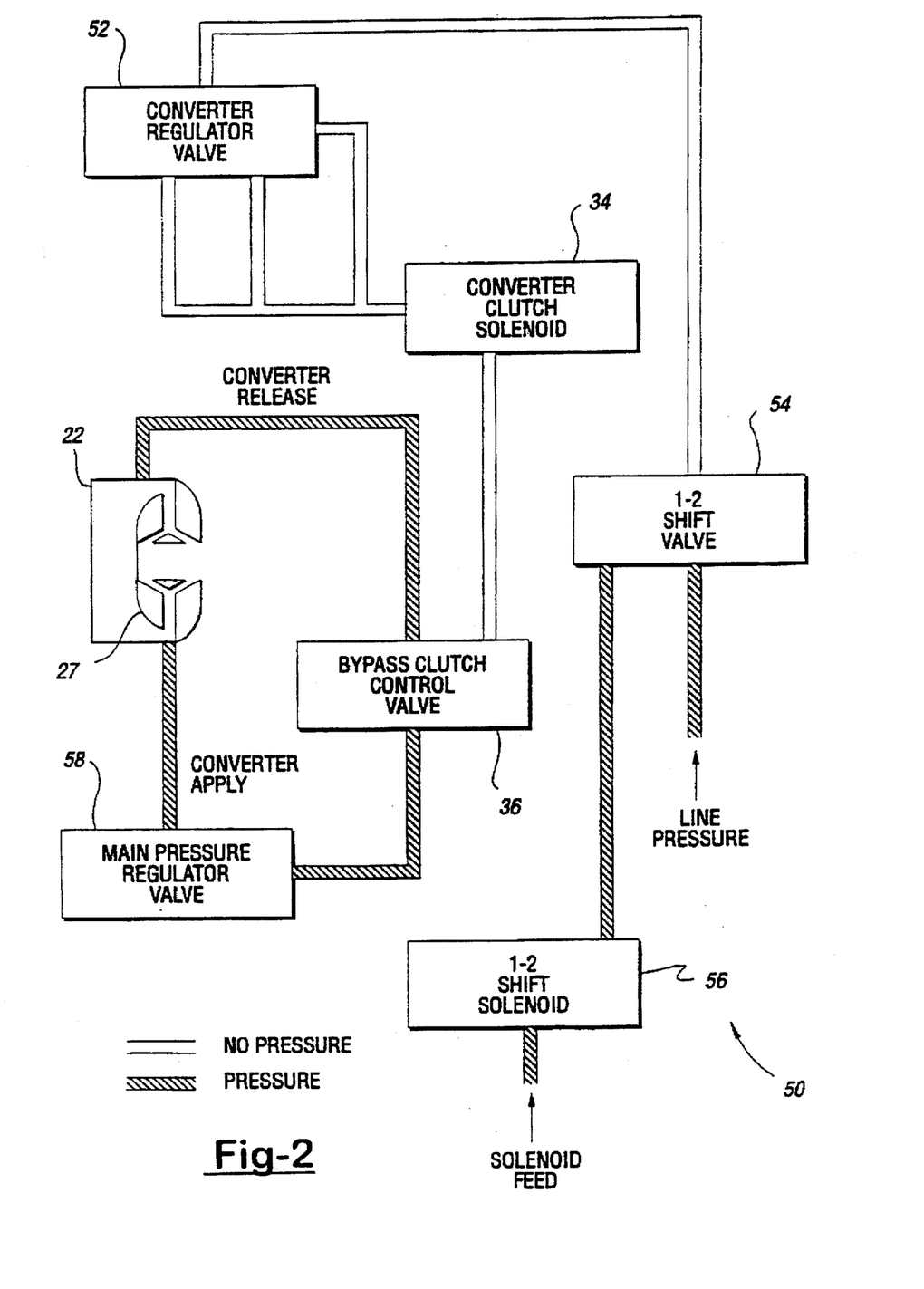
FIG. 2 is a torque converter clutch hydraulic apply circuit for use with the present invention.

Referring now to FIG. 2, there is shown a torque converter clutch apply circuit, shown generally by reference numeral 50, for use with the system shown in FIG. 1. In the preferred embodiment, the torque converter clutch solenoid functional test utilizes the hydraulic design of the apply circuit 50. As shown, the apply circuit 50 includes a converter regulator valve 52 in fluid communication with the TCC solenoid 34 (FIG. 1) and a 1–2 shift valve 54. The 1–2 shift valve 54 receives hydraulic fluid at line pressure, and also from a normally open 1–2 shift solenoid 56.

The TCC solenoid 34 is in fluid communication with the BCC valve 36, which in turn is in fluid communication with the torque converter 22 and a main pressure regulator valve 58. The TCC solenoid 34 controls the position of the bypass clutch control valve. As described in U.S. Pat. No. 5,445,016, assigned to the assignee of the present invention, which is incorporated herein by reference (the '016 patent), in first gear, no pressure is supplied to the converter regulator valve 52 and solenoid 34 via the 1–2 shift valve 54. As such, even if the converter solenoid is energized, no hydraulic fluid is provided to the bypass clutch control valve 36 and hence no lockup is possible. The BCC valve, in its normal first gear state, allows pressure to be fed to the release side of the torque converter 22, keeping the converter unlocked in first. If the BCC valve 36 is stuck in the wrong position, however, release pressure is cut-off and the converter 22 will apply (apply pressure is always fed to the converter).

Thus, in a preferred embodiment, the application of the converter clutch 29 is hydraulically inhibited while the transmission 14 is in first gear, by use of the BCC valve 36. In such an embodiment, the torque converter clutch can not be applied in first gear, even if a 100% duty cycle is output to the solenoid 34. However, alternative transmission designs enable the use of the TCC in first gear. In such an alternative embodiment, the TCC may similarly be tested upon being commanded "off" as described in copending patent application Ser. No. 08/699,741 by Hathaway et al, filed Aug. 20, 1996, assigned to the assignee of the present application, and which is incorporated herein by reference ('741 application).

The test logic continuously monitors the state of the torque converter clutch 29. If the converter clutch is applied in first gear, then a hydraulic malfunction (e.g. bypass clutch control valve stuck on) exists in a preferred embodiment. Similarly, if the converter clutch is applied in every forward gear, then the bypass clutch control valve 36 is in an incorrect position (e.g. stuck on), and the state of the TCC solenoid 34 can not accurately be determined. If the converter clutch is not applied in first gear, but is applied in all remaining gears, then the solenoid 34 may be the cause. Thus, if the converter clutch is applied in a gear other than first, the cause could be either a hydraulic malfunction, or a malfunctioning torque converter clutch solenoid.

The present invention also monitors the time which elapses from the command to lock the clutch to the point where the clutch is determined to be locked, or engaged, as well as the time which elapses from the command to unlock the clutch to the point where the clutch is determined to be unlocked, or disengaged. This amount of time is affected by internal pressure leaks, degradation of the friction surfaces, or other torque converter defects and failures.

Where the present invention is used during manufacture of the torque converter, a torque converter which takes an improper amount of time to lock or unlock is rejected and further diagnosis is performed to correct any defect. The time to lock or unlock the clutch varies depending on the construction of the torque converter and the logic used to provide smooth shifts. Therefore, this time is calibratible for each transmission application. Example of one application in the Ford AXOD-E transmission include times of approximately 0.3–0.5 seconds for lockup and 0.2 seconds for unlock.

Figure 3:
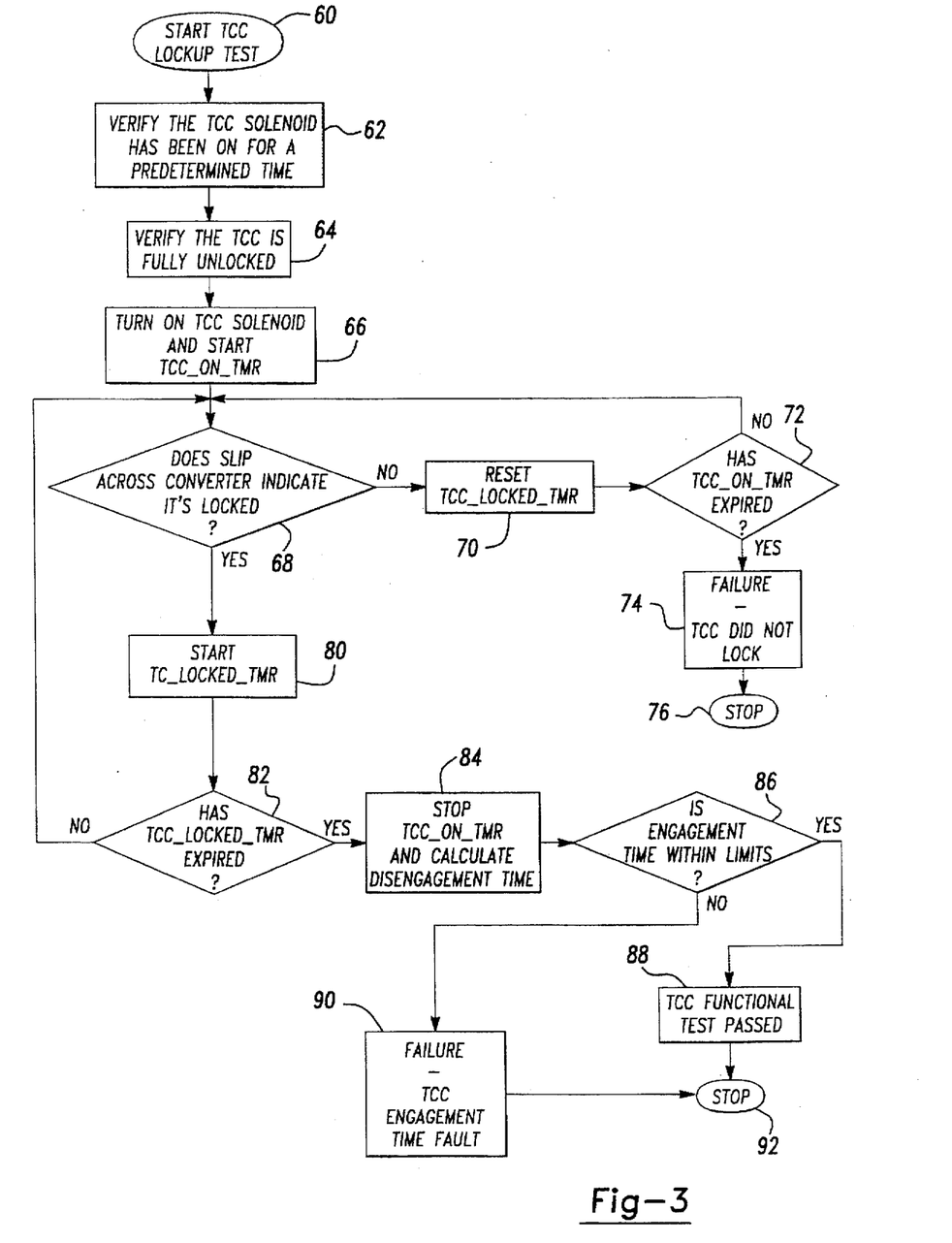
FIG. 3 is a flowchart detailing a torque converter clutch lockup test according to the present invention.
Figure 4:
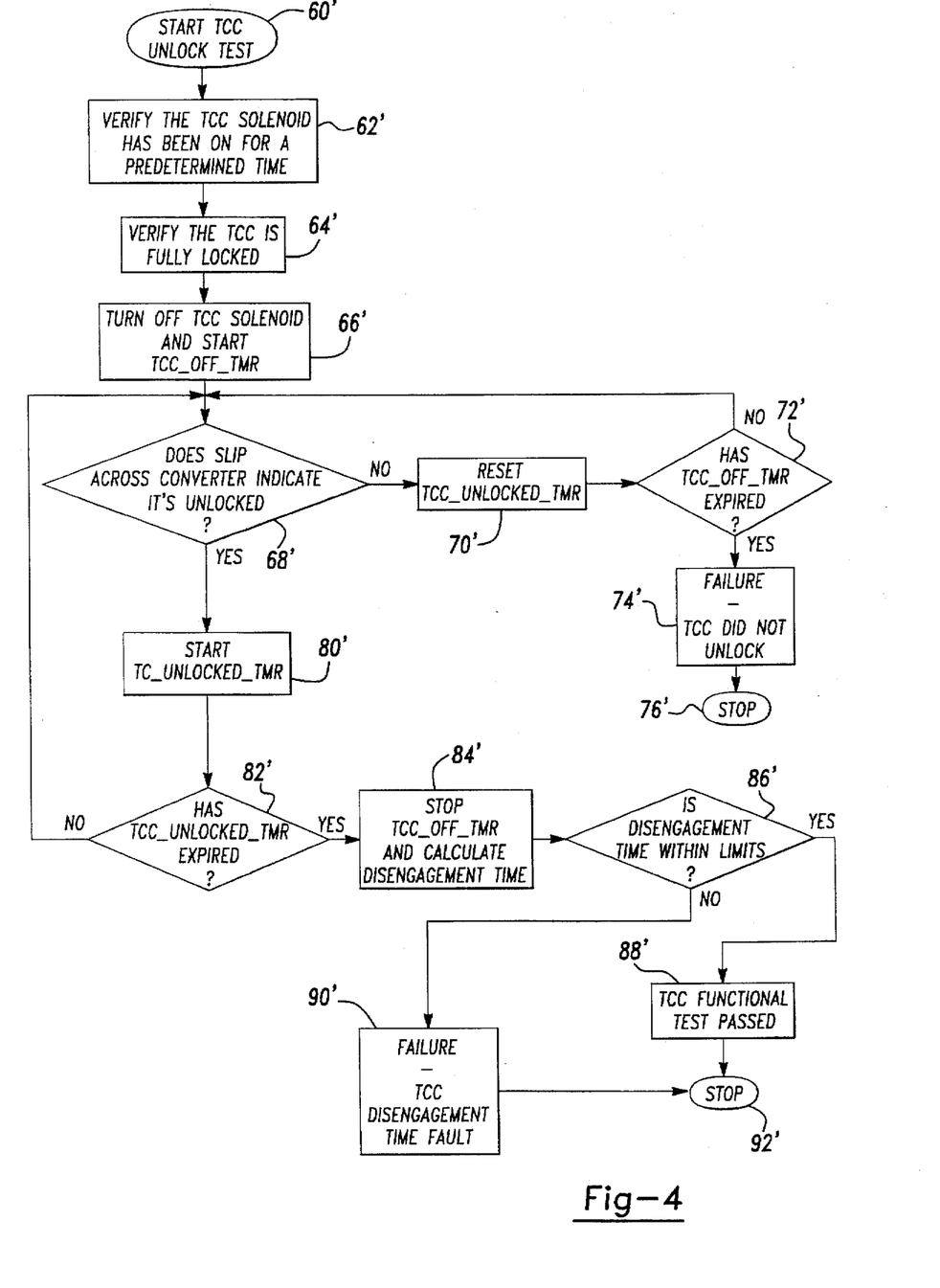
FIG. 4 is a flowchart detailing a torque converter clutch unlock test according to the present invention.

Referring now to FIGS. 3 and 4, there are shown flowcharts detailing the torque converter clutch (TCC) timed lockup and timed unlock tests according to the present invention. The present tests are run during power-on conditions, as described in the '741 application. As shown in FIG. 3, the TCC timed lockup test is originated at the command to lockup the torque converter clutch 60. The test verifies 62 the TCC solenoid has been commanded off for a predetermined time prior to the command to lockup the clutch. This is preferably established by using counters as described in the '016 patent to establish the commanded state of the solenoid and a timer which is restarted upon a commanded change in state of the solenoid. The test further verifies the clutch is unlocked 64 using the techniques taught in the '016 patent and '741 application, wherein it is determined the slip across the converter is greater than a calibratible amount. A command is given 66 to lock the clutch by commanding the solenoid "on" and a timer is started ($TCC_{13}ON_{13}TMR$) which measures the time taken for the lockup to occur.

The slip across the converter is measured 68, and the test determines whether the clutch is locked, as described in the '016 patent and '741 application. If the clutch is determined to be unlocked, a second timer which designates the TCC is locked ($TCC_{13}LOCKED_{13}TMR$) is reset 70. The elapsed time from the command to lock the clutch to present ($TCC_{13}ON_{13}TMR$) is compared with a calibratible limit 72. If the time exceeds the calibratible limit before the clutch slip falls below a calibratible limit, then the lockup has been determined to have not occurred 74, a failure code ($TCC_{13}did_{13}not_{13}lock$) is set, and the test stopped 76. The $TCC_{13}LOCKED_{13}TMR$ will continue to increment as long as the slip across the converter is below the calibratible amount, indicating a locked converter. If the $TCC_{13}ON_{13}TMR$ timer has not expired 72, the above sequence is run until the clutch locks 68 or the calibratible limit ($TCC_{13}ON_{13}TMR$) is exceeded 72.

When the slip across the torque converted falls below the calibratible limit, indicating the clutch is locked 68, the $TCC_{13}LOCKED_{13}TMR$ is started 80. The $TCC_{13}LOCKED_{13}TMR$ measures the time the torque converter is continuously locked. The timer is required to exceed a calibratible time value for the lock to be considered completed. If the slip rises above the calibratible limit 68 before the $TCC_{13}LOCKED_{13}TMR$ exceeds a calibratible limit, the $TCC_{13}LOCKED_{13}TMR$ is reset at 70. Once the $TCC_{13}LOCKED_{13}TMR$ exceeds the calibratible amount of time 82, the $TCC_{13}ON_{13}TMR$ is stopped 84. The torque converter engagement time is calculated by subtracting the $TCC_{13}LOCKED_{13}TMR$ value from the $TCC_{13}ON_{13}TMR$ value 84. The time difference is the time required for the torque converter to fully lock. The time is evaluated by comparing it to a calibratible minimum and maximum time limit 86 and a failure code set accordingly 88, 92 to indicate a proper lock or failure.

If the test determines the lockup did not occur within a calibratible limit 90, a leak is possible. Therefore, this torque converter may be rejected at a manufacturing site and further tested at a repair station to correct the failure. Likewise, a torque converter may be further tested in a vehicle which exhibits such a failure through testing by a repair facility. Furthermore, the ECU 16 may use this information during operation of the vehicle to increase line pressure 58 or increase the ramp rate of the duty cycle on the torque converter solenoid 34 to hasten a slow clutch application and improve driver satisfaction and improve durability. Likewise, a converter which fails for too quick of a clutch application may be adjusted by the ECU decreasing the pressure or duty cycle of the solenoid 34.

The test further includes an algorithm for a timed test for the unlock of the TCC clutch, as illustrated in FIG. 4. The unlock timed test is preferably performed only after a successful timed lockup test. The test begins 60' when the torque converter has been electronically "on" a predetermined amount of time 62'. The slip across the converter is measured and must remain less than a calibratible amount 64'. The test commands the torque converter solenoid "off" and starts a timer($TCC_{13}OFF_{13}TMR$) 66'.

As measured in a manner taught by the '016 patent and the '741 application, once the slip across the converter rises above a calibratible amount, a second timer ($TCC_{13}UNLOCKED_{13}TMR$) is started 70'. The $TCC_{13}UNLOCKED_{13}TMR$ measures the time the torque converter has been continuously unlocked. If the $TCC_{13}OFF_{13}TMR$ exceeds a calibratible amount of time before the slip across the converter rises above the calibratible amount 72', a failure code (TCC did not unlock) is set 74', and the test exited 76'.

When the slip across the converter indicates an unlocked clutch 68', the $TCC_{13}UNLOCKED_{13}TMR$ is started 80'. If the $TCC_{13}UNLOCKED_{13}TMR$ does not exceed a calibratible limit 82', the status of the clutch is again verified 68'. The $TCC_{13}UNLOCKED_{13}TMR$ will continue to increment as long as the slip across the converter is above the calibratible amount, indicating a unlocked converter 80'. If the slip across the converter falls below the calibratible amount 68', indicating a locked converter, and the $TCC_{13}UNLOCKED_{13}TMR$ has not exceeded a calibratible amount of time 72', the $TCC_{13}UNLOCKED_{13}TMR$ is reset to zero 70'. Once the clutch is continuously unlocked 68' for a calibratible amount of time 82', the $TCC_{13}OFF_{13}TMR$ is stopped 84' and the clutch disengagement time is calculated 84'. The disengagement time is calculated by subtracting the $TCC_{13}UNLOCKED_{13}TMR$ value from the $TCC_{13}OFF_{13}TMR$ value. The time difference is the time required for the torque converter to fully unlock. The time is evaluated by comparing it to a minimum and maximum time limit 86' and a failure code is set if the time is outside these limits 90'. If the time is within the limits, the test has passed.

Failure of the timed unlock test will result in a rejection at the transmission manufacturing site, assembly plant, and at a vehicle repair site. The cause of the timed unlock failure will then be further diagnosed. Furthermore, the ECU 16 may adjust line pressure 58 or modify the ramp rate of the duty cycle on the torque converter solenoid 34 to improve the lock and unlock time.

Preferably, the status of the BCC valve and TCC solenoid are established as described in the '741 application, prior to running the timed lock and timed unlock tests. The torque converter slippage is preferably determined using the method described in the '016 patent using a turbine speed sensor and the '741 application without a turbine speed sensor, by comparing the torque converter input speed and output speed. This calculated slippage is compared to calibratible slippage limits to establish whether the clutch is locked or unlocked as described above.

It is understood that while the form of the invention herein shown and described constitutes the preferred embodiment of the invention, it is not intended to illustrate all possible forms thereof. It will also be understood that the words used are words of description rather than limitation, and that various changes may be made without departing from the spirit and scope of the invention as disclosed.

I claim:

1. For use with a vehicle having an electronic control unit and a driveline system including an engine, a transmission, a torque converter operating to transfer engine torque to the transmission, a torque converter clutch having an applied state, and a solenoid to change the commanded apply state of the clutch, a method for testing the application of the clutch comprising:

determining the state of the solenoid;
   determining the applied state of the clutch;
   commanding a change in the applied state of the clutch; and
   determining the time for the clutch to change applied state.

2. The method for testing the application of the torque converter clutch according to claim 1, wherein determining the applied state of the clutch comprises measuring the clutch slippage and comparing the slippage to a calibratible limit.

3. The method for testing the application of the torque converter clutch according to claim 2, wherein determining the time for the clutch to change applied state comprises:

starting a first timer at the commanded change in clutch applied state;
   measuring clutch slippage until a change in applied state is established for a calibratible amount of time;
   starting a second timer upon the detection of a change in clutch applied state;
   resetting the second timer if the clutch has not changed applied state and restarting the second timer upon a detected change of clutch applied state until the second timer exceeds a calibratible limit; and
   calculating a state change time by subtracting the value of the second timer from the value of the first timer.

4. The method for testing the application of the torque converter clutch according to claim 3, wherein the test is failed if the state change time is greater than a calibratible limit.

5. The method for testing the application of the torque converter clutch according to claim 4, wherein the test is failed if the state change time is less than a calibratible limit.

6. The method for testing the application of the torque converter clutch according to claim 5, wherein the test is failed if the clutch does not change state within a calibratible time limit.

7. The method for testing the application of the torque converter clutch according to claim 4, wherein the clutch is commanded to change applied state to the applied condition.

8. The method for testing the application of the torque converter clutch according to claim 7, wherein said solenoid has a duty cycle and the duty cycle is increased to apply the clutch.

9. The method for testing the application of the torque converter clutch according to claim 7, wherein the transmission includes a hydraulic pressure applied to apply said clutch, wherein said pressure is increased to apply the clutch.

10. The method for testing the application of the torque converter clutch according to claim 4, wherein the clutch is commanded to change applied state to the not applied condition.

11. A computer storage medium for improving the engagement of a clutch in a torque converter of a transmission in a vehicle having an electronic control unit controlling a solenoid for directing fluid pressure to the torque converter clutch to change an applied state of the clutch, the computer storage medium comprising:

solenoid apply state determination means;
    clutch apply state determination means;
    clutch command means for commanding a change in the applied state of the clutch; and
    time means for determining the time for the clutch to change applied state.

12. The computer storage medium according to claim 11 further comprising a correction means for changing the apply rate of the clutch.

13. The computer storage medium according to claim 12 wherein the solenoid has a duty cycle and the correction means for changing the apply rate of the clutch comprises said duty cycle being increased to apply the clutch.

14. The computer storage medium according to claim 12 wherein the correction means for changing the apply rate of the clutch comprises increasing said hydraulic pressure to apply the clutch.

* * * * *

UNITED STATES PATENT AND TRADEMARK OFFICE
CERTIFICATE OF CORRECTION

PATENT NO. : 5,693,878
DATED : December 2, 1997
INVENTOR(S) : Peter J. Giles

It is certified that error appears in the above-identified patent and that said Letters Patent is hereby corrected as shown below:

The title page should be deleted to appear as per attached title page.

The sheet of drawing, consisting of figure 3, should be deleted to appear as per attached sheet.

Signed and Sealed this

Sixth Day of March, 2001

Attest:

NICHOLAS P. GODICI

Attesting Officer

Acting Director of the United States Patent and Trademark Office

United States Patent [19]

Giles

[11] Patent Number: 5,693,878
[45] Date of Patent: Dec. 2, 1997

[54] TORQUE CONVERTER CLUTCH ENGAGEMENT TEST

[75] Inventor: Peter J. Giles, Ypsilanti, Mich.

[73] Assignee: Ford Global Technologies, Inc., Dearborn, Mich.

[21] Appl. No.: 788,095

[22] Filed: Jan. 23, 1997

[51] Int. Cl.[6] .................... G01M 15/00; G01M 19/00
[52] U.S. Cl. .................... 73/118.1; 340/453; 364/424.08
[58] Field of Search .................... 73/116, 117.2, 73/117.3, 118.1; 340/438, 439, 453, 454; 364/424.08, 424.081

[56] References Cited

U.S. PATENT DOCUMENTS

| | | | |
|---|---|---|---|
| 5,089,804 | 2/1992 | Mimura | 340/453 |
| 5,129,259 | 7/1992 | View et al. | 340/453 |
| 5,189,908 | 3/1993 | Sano et al. | 73/118.1 |
| 5,455,016 | 10/1995 | Neigebauer | 73/118.1 |
| 5,467,644 | 11/1995 | Schaffer | 73/118.1 |
| 5,594,643 | 1/1997 | Birchenough et al. | 364/424.08 |
| 5,598,334 | 1/1997 | Shin et al. | 364/424.08 |
| 5,598,336 | 1/1997 | Kume et al. | 364/424.08 |

Primary Examiner—George M. Dombroske
Attorney, Agent, or Firm—James J. Dottavio

[57] ABSTRACT

A method for testing the application of a torque converter clutch in vehicle having an electronic control unit and a driveline system including an engine, a transmission, a torque converter operating to transfer engine torque to the transmission, a torque converter clutch having an applied state, and a solenoid to change the commanded apply state of the clutch. The test includes determining the state of the solenoid, determining the applied state of the clutch, commanding a change in the applied state of the clutch, and determining the time for the clutch to change applied state.

14 Claims, 4 Drawing Sheets

Fig-3